Jan. 23, 1968  B. T. HESTEHAVE  3,364,520
APPARATUS FOR BLOW MOLDING HOLLOW PLASTIC
ARTICLES HAVING A NECK PORTION
Filed June 19, 1962  7 Sheets-Sheet 7
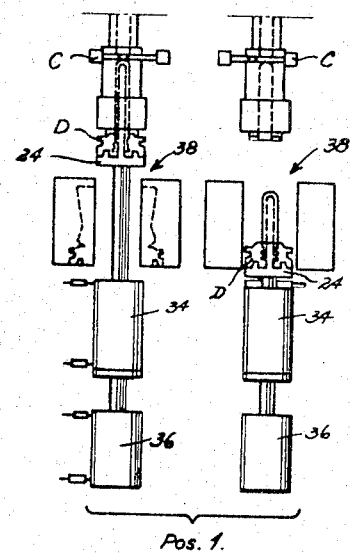
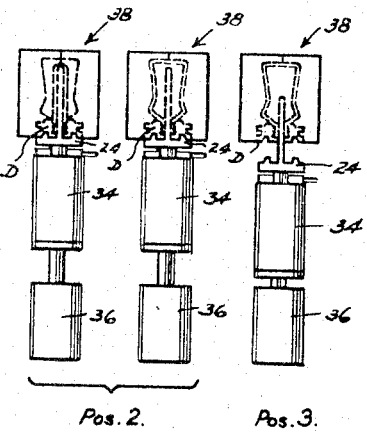
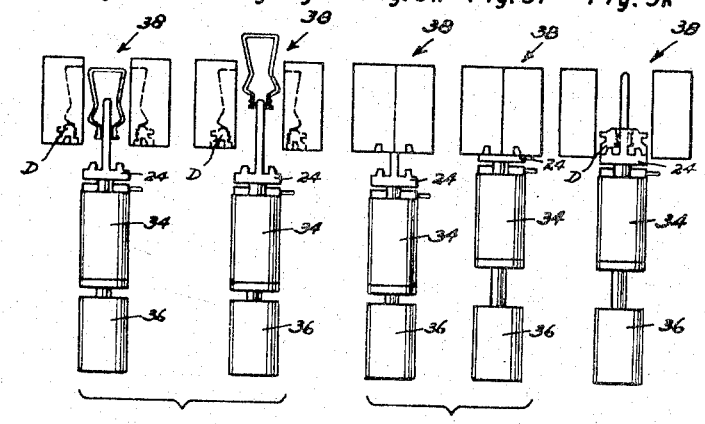
Inventor
BORGE T. HESTEHAVE
By Dicke & Craig
Attorneys

United States Patent Office 3,364,520
Patented Jan. 23, 1968

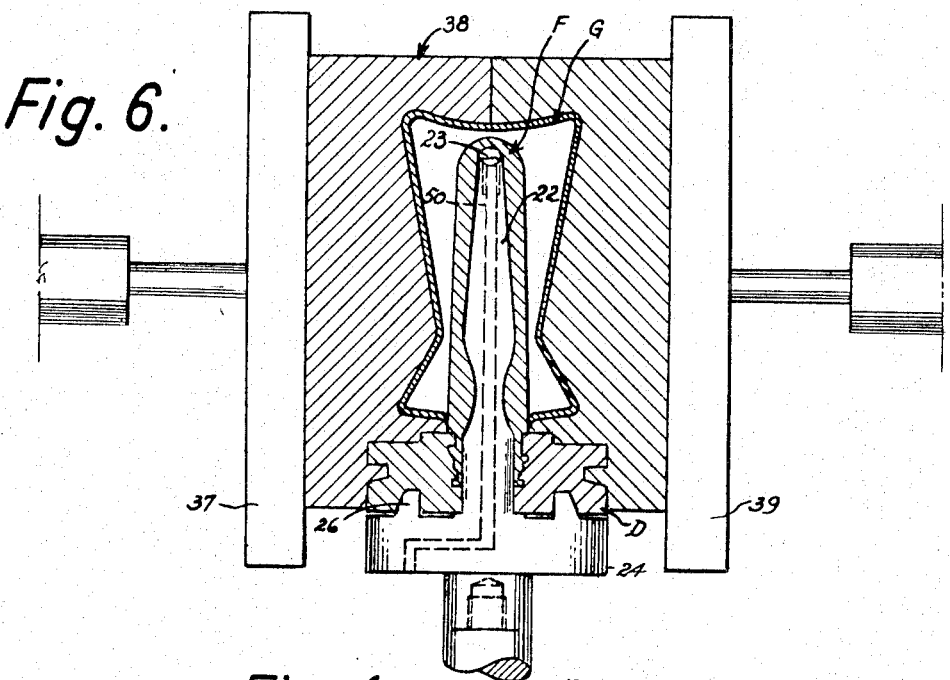
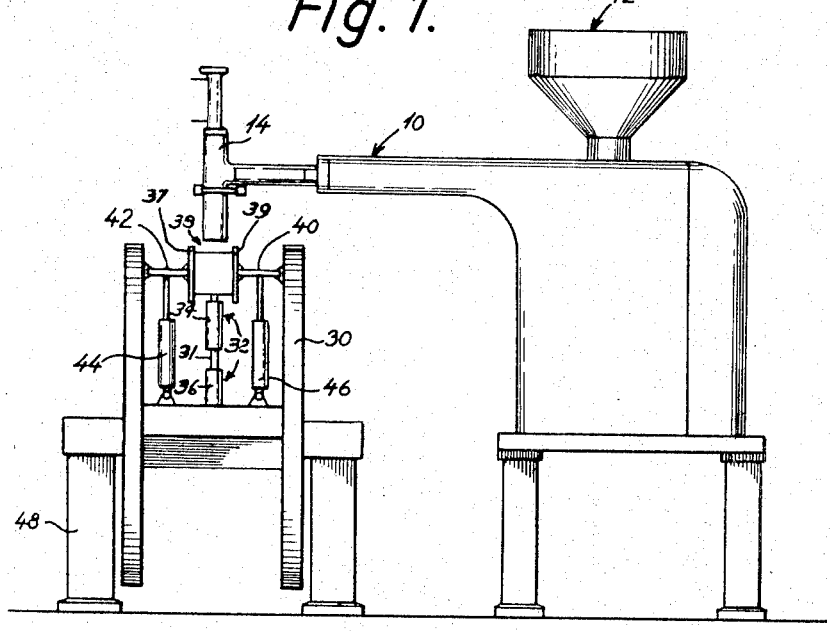
Inventor
BORGE T. HESTEHAVE
By Dicke & Craig
Attorneys

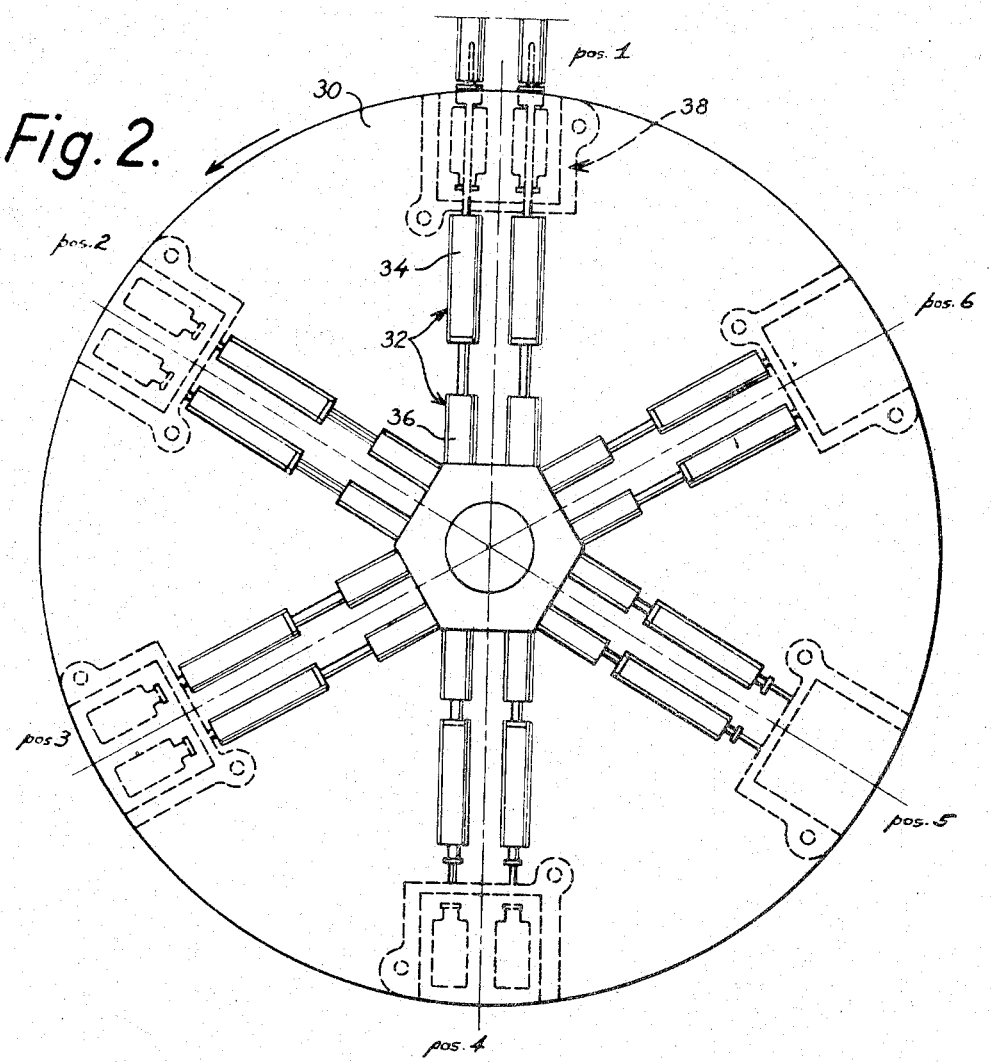

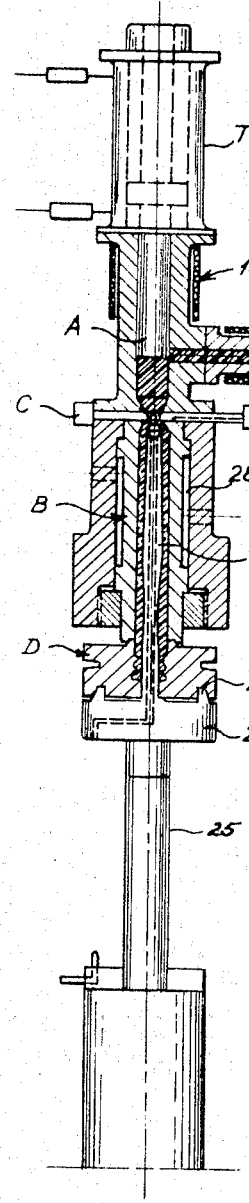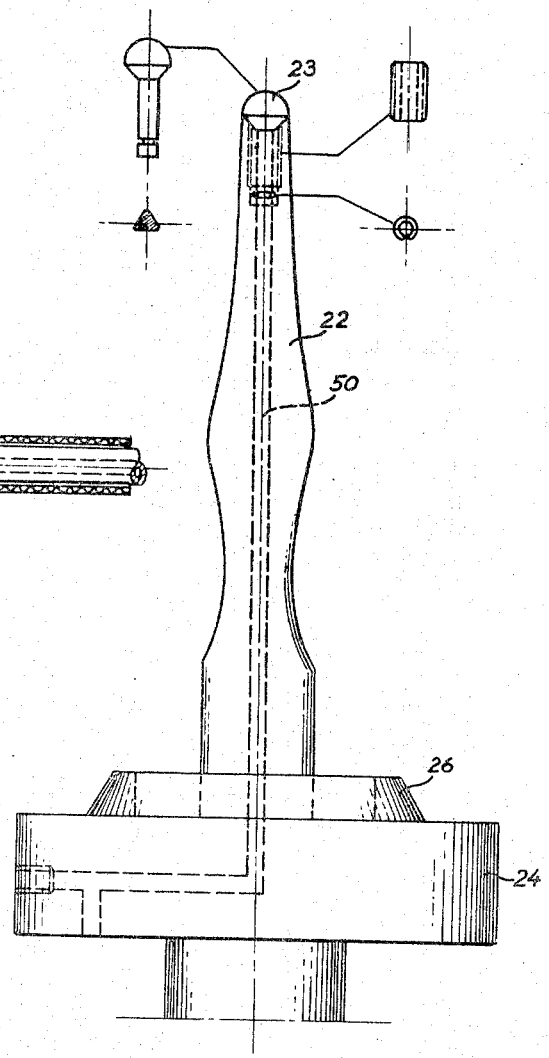

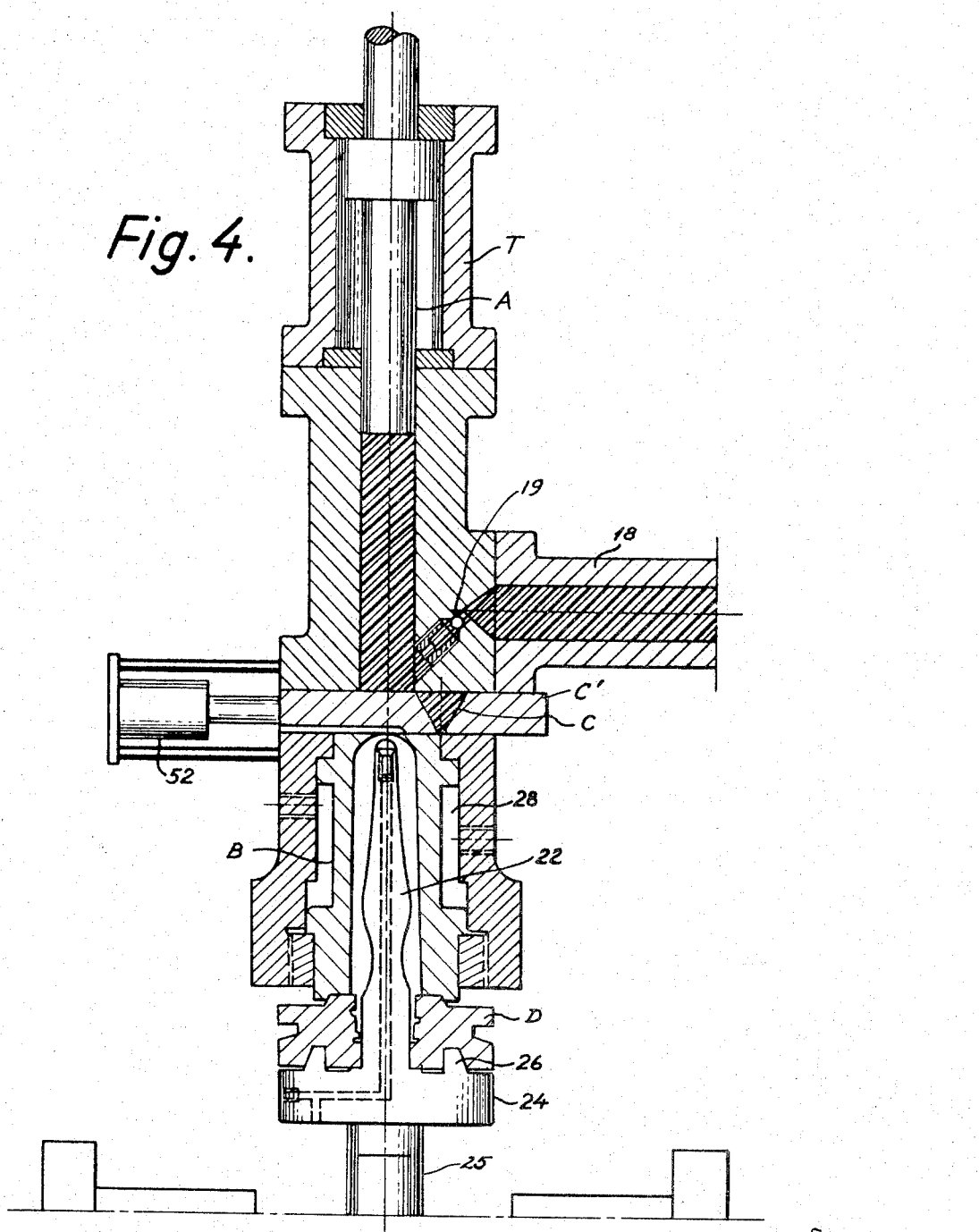

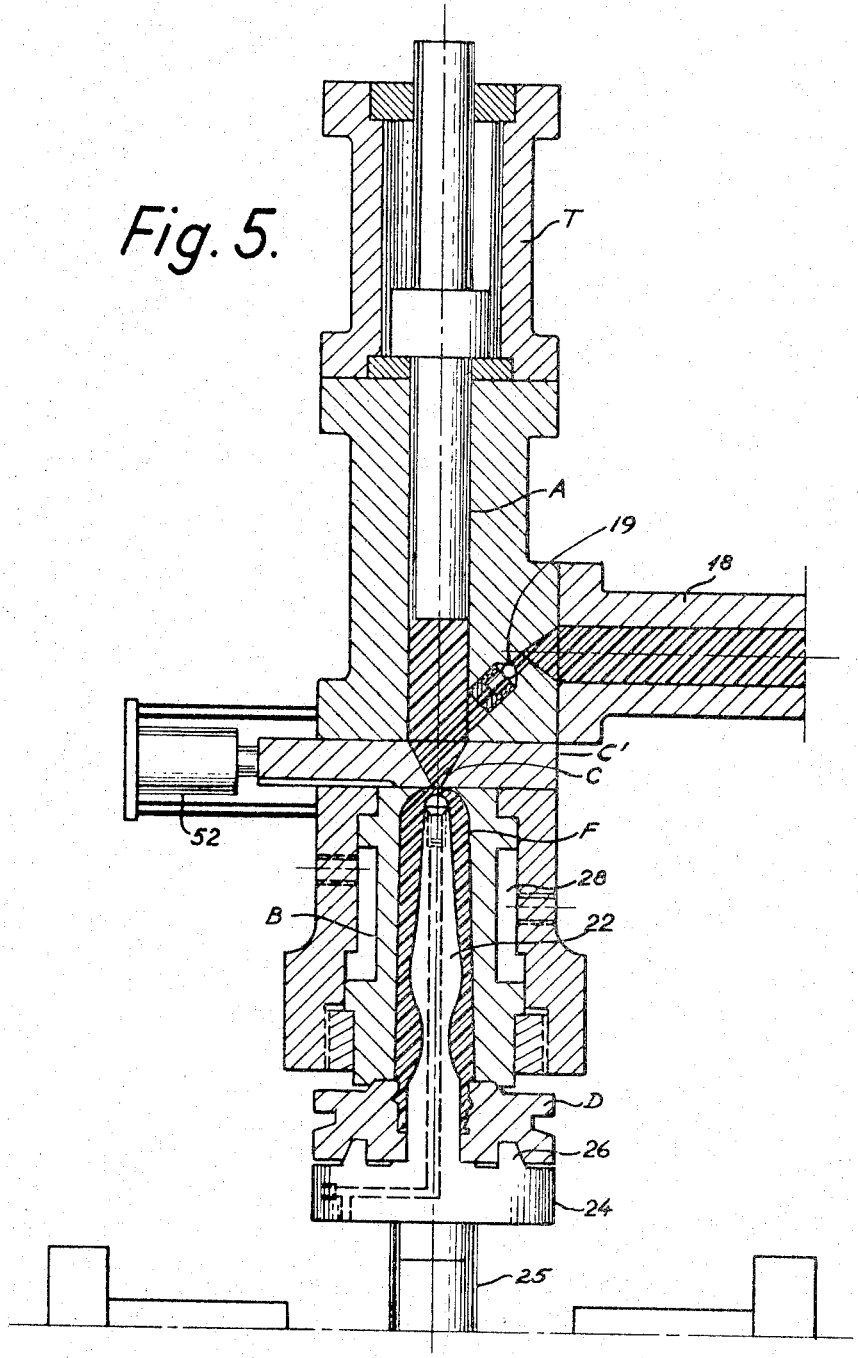

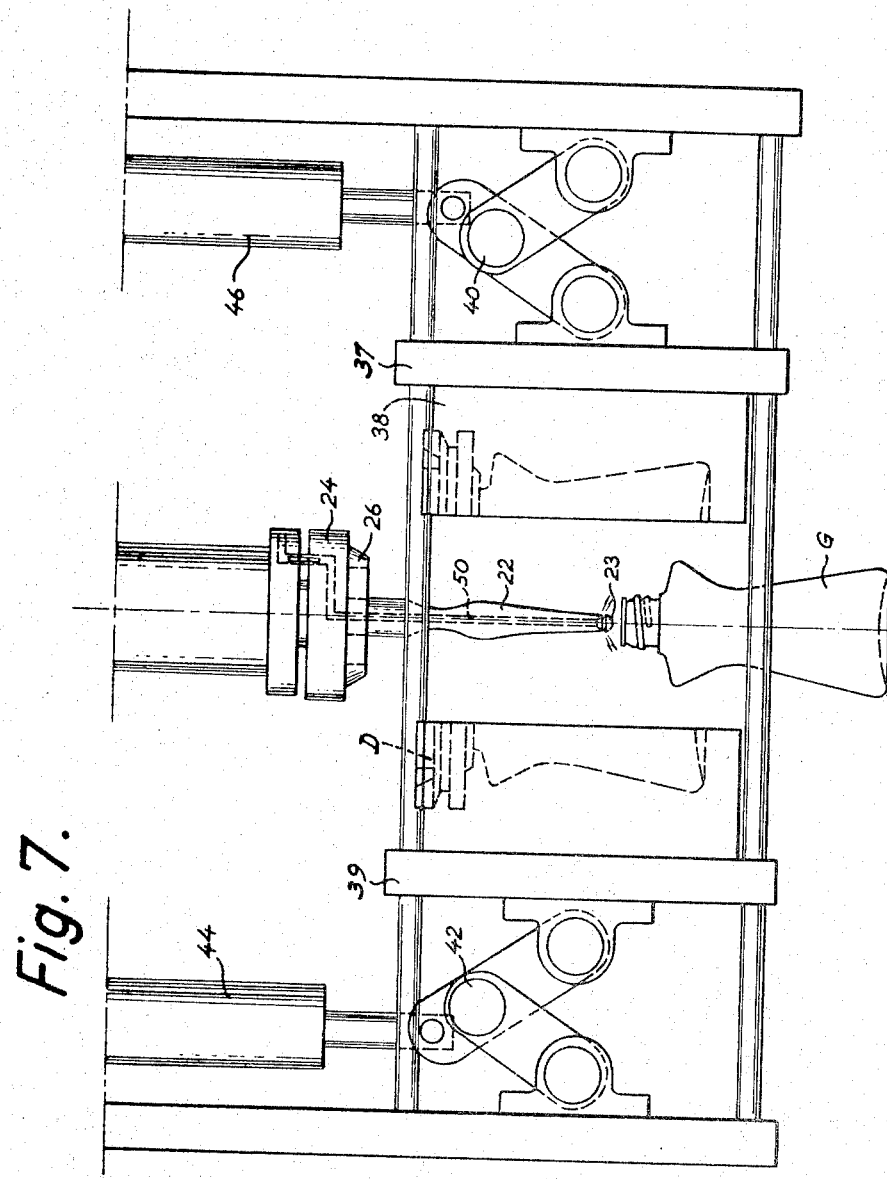

3,364,520
APPARATUS FOR BLOW MOLDING HOLLOW PLASTIC ARTICLES HAVING A NECK PORTION
Borge T. Hestehave, 12219 S. Meadow Green Road, Whittier, Calif. 90604
Filed June 19, 1962, Ser. No. 203,569
Claims priority, application Great Britain, June 19, 1961, 22,115/61
13 Claims. (Cl. 18—5)

ABSTRACT OF THE DISCLOSURE

A machine for molding hollow bodies of synthetic resinous material which are provided with a neck portion, which comprises a mandrel adapted to be reciprocated, a parison mold adapted to receive the mandrel, a neck-receiving means adapted to be opened and closed and surrounding the mandrel near one end of the parison mold; a device for injecting synthetic resinous material into the parison mold is provided to form a parison on the mandrel, and a control mechanism is operable to withdraw the mandrel together with the neck-receiving ring maintained closed over the neck portion of the parison formed on the mandrel by reciprocation of the mandrel into a blow mold having a molding cavity which corresponds to the size of the article; the blow mold is so constructed as to receive the neck-receiving means, the control mechanism also being operable to transfer the mandrel with the parison formed thereon as well as with the neck-receiving ring to the blow mold whereupon appropriate blow means are provided for blowing the article in the mold; upon completing the blowing of the article, the control mechanism withdraws the mandrel from the blow mold while leaving the neck-receiving ring in the blow mold and thereafter is operable to open the blow mold together with the neck-receiving means to enable removal of the article.

The present invention relates to apparatus for blow molding hollow plastic articles.

An object of the present invention is the provision of an efficient machine for manufacturing hollow plastic articles utilizing manufacturing steps including the formation of a parison followed by blow-molding of the finished article.

Still a further object of the present invention is the provision of a machine for carrying out said manufacturing steps, which includes a mandrel which can be used alternately with an injection-molding process for forming a parison thereon and with a blow-molding process.

Still a further object of the present invention is the provision of a machine for the purposes specified hereinabove, which comprises a mandrel structure including holding means for operatively engaging neck-receiving means and disengageable from the neck-receiving means to effectively provide for release of the finished article.

Still a further object of the present invention is the provision of a machine for the purposes specified hereinabove which can be designed for continuous mass production.

Still a further object of the present invention is to provide a mass production machine having a plurality of working stations indexable from stage to stage and operable to perform different steps of an operating cycle at different stages thereof.

Further objects, features and advantages of the present invention will become more obvious from the following description when taken in connection with the accompanying drawing which shows, for purposes of illustration only, one embodiment in accordance with the present invention, and wherein FIGURE 1 is a schematic side view of a machine according to the present invention;
FIGURE 2 is a schematic side view of a turntable arrangement used in the machine shown in FIGURE 1;
FIGURE 3 is a section through a mandrel and neck-ring structure in the injection mold system for the machine shown in FIGURE 1;
FIGURE 4 is a section through the injection head in the injection position;
FIGURE 5 is a section, similar to FIGURE 4, showing the completed injection;
FIGURE 6 is a section through the mold;
FIGURE 7 is a partial section through the machine illustrating the injection of an article;
FIURE 8 is a view of the mandrel illustrating the air duct supply system, and
FIGURES 9a–9k are schematic views of the arrangement shown in FIGURE 2 illustrating the different stages of molding.

The present invention is described, in the following example, in connection with the manufacture of a plastic bottle G of the shape shown in FIGURE 7. This bottle has an integral screw-threaded neck portion and a substantially even wall thickness throughout the entire length. It will be understood, however, that the invention is not limited to the manufacture of bottles and that the method as well as the machine is applicable to make containers, jars, toys, collapsible tubes and other hollow objects from any suitable synthetic resinous material which is capable of being injected and blown, such as low density or high density polyethylene, styrene or vinyl.

The method to be described in more detail hereinafter with reference to the description of the mode of operation of the machine according to the present invention comprises in broad terms the steps of injecting a parison which includes a neck portion integral therewith in a substantially vertical direction around a mandrel, transferring the mandrel while maintained in said substantially vertical position into a blow-molding position and simultaneously keeping the neck enclosed, blowing the article and thereafter releasing the neck and removing the article.

More specifically, the method comprises the steps of injecting an integral neck and parison into a parison mold, generally designated by reference character B in which a mandrel 22 is mounted substantially vertically for reciprocation, withdrawing the mandrel 22 with the parison and neck portion molded thereon in the axial direction relatively to the parison mold with the neck mold means generally designated by reference character D maintained closed over the neck portion, transferring the mandrel to a blow mold generally designated by reference numeral 38 together with the closed neck mold means D, blowing the article in the blow mold 38 and thereafter opening the neck mold means D together with the blow mold 38 and removing the article.

With more specific reference to the drawing, the machine comprises a substantially vertical parison mold generally designated by reference character B adapted to receive the mandrel 22. The mandrel 22 is surrounded at its lower end by the neck-receiving means generally designated by reference character D which is in the form of an annular member or ring comprising two half-parts. An injection system for the plastic or synthetic resinous material is provided with an injection system comprising, for example, a plunger A for injecting the plastic material into the parison mold B to form a parison F on the mandrel 22.

Means to be more fully described hereinafter and comprising hydraulic cylinders generally designated by reference numeral 32 are provided for withdrawing the mandrel structure including the neck-ring D, maintained closed over the neck portion of the parison F formed on the mandrel 22, from the parison mold B by reciprocation of the mandrel 22 substantially in the vertical direction.

The control means provides for indexing the mandrel structure in alignment with the blow mold 38 which has a molding cavity corresponding to the size of the desired article as well as means for receiving the neck-ring. Means are provided for thereafter blowing the article in the blow mold 38 and means are provided for eventually opening the blow mold 38 together with the neck-ring D to remove the article.

More specifically with reference to FIGURES 1 and 3, the machine comprises an extruder, generally designated by reference numeral 10 which is connected to a hopper 12. The extruder 10 is connected to an injection head 14 which, as shown in FIGURE 3, is surrounded by a heater 16 and in which a plunger A is movably controlled by means of a piston in a cylinder T, such as a hydraulic or pneumatic cylinder.

The injection system further includes a manifold 18 which is connected with the extruder 10. The manifold 18 as well as the extruder 10 may be provided with suitable heater means 20, as shown in FIGURE 3.

The parison mold B forms a part of a bushing structure disposed below the injection head 14. An annular cavity 28 is provided in the bushing structure for the circulation of a cooling medium which is supplied through an inlet and outlet, indicated in dotted lines in FIGURE 3.

The mandrel structure includes the mandrel 22 (FIGURES 3, 4, 5 and 8) which is in the form of an elongated member of different diameter along its entire length to provide for injection-molding of the parison F with different wall thickness over its length, governed by the shape of the blown finished article to effectively provide for blowing of the article with a substantially uniform wall thickness. As will be obvious, the parison must have the thickest wall portions at those parts where the finished article is blown to a size having the larger diametric portions, in the case of the bulb G illustrated near the top and the bottom thereof.

The mandrel structure also includes, at its lower end, a catching member 24 for engagement with the neck-ring portions forming the neck mold means D, provided with indexing means defining complementary engagement means, such as an upwardly projecting annular rib 26 for engagement with a corresponding annular groove 26' in the downwardly facing surfaces of the neck-ring portions.

The mandrel structure is supported on a reciprocable piston rod 25 of the piston arranged within a pneumatic or hydraulic cylinder 34 which forms a part of control means generally designated by reference numeral 32 and which includes a second cylinder 36, on the piston rod 31 of which the cylinder 34 is mounted for reciprocation.

The control means 32 including the cylinders 34 and 36 with their piston rods and the mandrel structure is supported on a substantially vertical turntable structure comprising a turntable 30 having a plurality of identical operating stations, in the embodiment shown in FIGURE 2, six operating stations.

To provide for mass production, each operating station shown includes a double set of cylinders and a double blow mold 38 having two molding cavities for receiving each of a pair of mandrel structures, as shown in FIGURE 3.

Each of the blow molds 38 comprises, as shown in FIGURES 1, 6, and 7, two half parts mounted on mold platens 37 and 39 which can be moved to open and close the mold by means of one of a pair of toggle mechanisms 40 and 42, respectively operable by means of hydraulic or pneumatic cylinders 44 and 46.

The turntable 30 (FIGURE 1) is rotatably arranged in a frame structure 48 about a substantially horizontal axis and a suitable mechanism (not shown) is provided for the stagewise movement of the turntable structure and indexing of the turntable in a plurality of positions in each of which the mandrel structure of an operating station is in operative alignment with the parison mold which, as is obvious from FIGURE 1, is supported in a position outside the turntable structure and is operable to receive the mandrel in a predetermined respective indexed position of the turntable 30.

As is apparent from the foregoing, the respective mandrel structure of each blow mold station is mounted for reciprocation between a position received in the blow mold when the latter is closed and a position projecting outside the turntable structure when the blow mold is open.

The control means, as exemplified by the cylinders 34 and 36, is operable to index the reciprocation stroke of the mandrel structure 22, 24 to achieve three different positions, viz. the injection mold position shown in FIGURES 3, 4 and 5; the blow-molding position shown in FIGURE 6, and a blow-off position to be more fully described with reference to the stages of FIGURE 9, and in which the neck-ring catching means 24 is disengaged from the neck-ring D so as to enable the two half parts of the neck-ring D to be opened together with the opening of the blow mold 38.

In the embodiment shown, the cylinder 36 is operable to control the stroke of the mandrel structure between the blow-off position and the neck-ring catching position, and the cylinder 34 is operable to control the stroke of the mandrel structure between the neck-ring catching position and the injection molding position. In addition, the neck-ring catching position or middle position of the stroke of the mandrel structure is the position in which the mandrel structure and the neck-ring are in alignment with the blow mold.

As will be obvious from the foregoing, FIGURE 6 illustrates the blow mold closed on the neck-ring with the mandrel extending into the blow cavity and the catching member in engagement with the neck-ring portions.

FIGURE 7 illustrates the position of the parts after the completion of the blowing of the article with the blow mold opened and the catching member 24 reciprocated to its inoperative disengaging position.

The machine further includes an air duct supply system illustrated in FIGURES 6, 7 and 8 comprising a hollow bore 50 which extends axially through the mandrel 22. The top end of the mandrel 22 is provided with a valve member 23 operable to be opened against resilient action in response to air pressure when air is supplied through the air duct 50 to perform the blowing operation.

As is apparent from FIGURES 3, 4, 5 and 6, the injection mold system is designed to mold a parison F around the mandrel 22, the lower end of which is received in the neck-ring D and constitutes the completely finished neck of the bottle shown under ejection in FIGURE 7.

In the injection mold system, a reciprocable slide C is provided having an aperture C' for providing communication between the injection head 14 and the parison mold. The movement of the slide to open and close the parison mold is controlled by means of a cylinder 52.

The flow of pressure medium to the various control cylinders may be controlled by means of solenoid valves or in any other convenient manner well known to those skilled in the art, and the timing of the various operations may be controlled by a fully automatic electronic timing arrangement which controls the flow of pressure fluid to the various cylinders.

Different types of such equipment are commercially available for automatic control of plastic molding machines and will, therefore, not be described hereinafter because it will be easy for those skilled in the art to order such commercially available equipment from a supplier only by specifying the timing requirements.

In brief terms, the control system includes means for timing the operations as follows:

The turntable is indexed to a position with a blow mold 38 open and the respective mandrel structure 22 in alignment with the parison mold B and with the catching member 24 in operative engagement with the neck-ring D.

In this position, the mandrel structure is reciprocated by means of the cylinder 34 to its operative position inside the parison mold B. The cylinder 52 is thereafter actuated to provide for the injection molding and the plastic material is injected into the parison mold. At this stage, the timer is operated to enable the plastic material to cool off enough to allow the parison to slip out of the parison mold B.

Thereafter, the mandrel structure is reciprocated to the middle position of its stroke with the parison mold B thereon to be received in the blow mold. Thereupon, the blow mold is closed on the mandrel structure including the neck-ring D and upon closing of the blow mold, air is supplied to the duct 50 to perform the blowing operation.

Upon completion of the blowing operation, the mandrel structure is further reciprocated under control of cylinder 36 to disengage the catch member 24 from the neck-ring whereafter the blow mold is opened. By such opening of the blow mold, the two neck-ring portions of neck-ring D follow respective half parts of the blow mold 38. To make sure that the neck-ring is opened simultaneously with the opening of the blow mold, suitable means may be provided, such as permanent or electromagnetic magnets incorporated in the blow mold structure, or suction means comprising air ducts in the blow mold structure or any other convenient means which may obviously be selected by those skilled in the art.

Thereafter, the finished article is removed, for example, by repeating the blowing, the blow mold 38 is closed to re-engage the two half parts of the neck-ring D, whereafter the mandrel structure is reciprocated to re-engage the catching member 24 with the neck-ring. Eventually the blow mold 38 is reopened and the cycle briefly described hereinabove is repeated.

More specifically, the mode of operation of the combined injection molding and blow molding machine described hereinabove and the method of manufacturing hollow articles will be as follows, reference being had to the operation of one station at the plurality of stages shown in FIGURE 2 and illustrated schematically in FIGURES 9a–9k.

At the first stage of the turntable identified as $pos_1$ in FIGURES 2, 9a and 9b, the blow mold 38 is open with the neck-ring D closed about the mandrel 22 and engaged by the catching member 24. By actuation of the cylinder 34, the mandrel structure is reciprocated to its exterior position shown at I in FIGURE 9a and corresponding to the position shown in FIGURE 4, with the mandrel received inside the parison mold B.

Still in $pos_1$ of the turntable, the cylinder 52 is actuated to move the slide C from the position shown in FIGURE 4 to the position thereof shown in FIGURE 5 so as to form a parison around a mandrel as indicated in FIGURE 5.

The operating stage I is maintained for a sufficient time interval which may be one or two seconds enabling the plastic to cool off enough so that the parison is able to slip out of the bushing B. In the meantime, the supply of plastic material is cut off by moving the slide C back from the position shown in FIGURE 5 to the position shown in FIGURE 4. This movement may be automatically controlled, for example, in response to supply of a predetermined amount of molded plastic or in response to other data, such as the plastic pressure in the parison mold B.

After the predetermined cooling time, the mandrel structure is moved downwardly by means of the control cylinder 34 to be disengaged from the parison mold and to be indexed in correct position relatively to the blow mold 38, such as illustrated at II of FIGURE 9b. As will be obvious, also this stage is carried out at $pos_1$ of the turntable 30.

The turntable 30 is thereafter indexed to the second position referred to as $pos_2$ in FIGURES 2, 9c and 9d. During this indexing or rotation of the turntable or at the second stage $pos_2$ thereof, the toggle members 40 and 42 are actuated by means of the cylinders 44 and 46 so as to close the blow mold 38 which represents stage III, as shown in FIGURE 9c.

At the indexing stage $pos_2$ and after stage III, the air duct system 50 in the mandrel 22 is connected with the air supply system and in the fourth stage IV of FIGURE 9d, the bottle is blown within the cavity of the blow mold 38.

The cooling is rapidly obtained by means of water cooling of the molds and the final cooling of the bottle may be obtained by using refrigerated air for blowing the bottle.

The turntable 30 is thereafter advanced to the next stage $pos_3$ in which, in operating stage V of FIGURE 9e, the mandrel structure is reciprocated by means of the cylinder 36 to disengage the catching member 24 from the neck-ring D.

The turntable 30 is thereafter indexed to its fourth $pos_4$, shown in FIGURES 2, 9f and 9g, at which, in operating stage VI, the blow mold 38 is opened by means of the operation of the toggle members 40 and 42 and the control cylinders 44 and 46 (FIG. 9f). As will be obvious from the foregoing description and the drawing, the bottle points downwardly at this stage and is blown off in operating stage VII (FIGURE 9g) by re-opening the access to the air duct 50. This position and the blowing-off of the bottle is correctly indicated in FIGURE 7. The bottle may be ejected onto a belt conveyor or other suitable transport means which moves the bottle further for filling and shipment.

The turntable is thereafter indexed to the fifth position $pos_5$ and either during the movement to this position or in the first operating stage VIII at $pos_5$, the mold is closed by means of the toggle mechanism to bring the two half parts of the neck-ring D together and condition the next neck-ring D for being locked or latched again (FIG. 9h). Also the re-locking or relatching of the neck-ring D by means of the member 24 is effectuated at $pos_5$, as indicated in stage IX of FIGURE 9i, by reciprocating the mandrel structure controlled by the cylinder 36 to its middle position of the stroke.

The turntable is thereafter advanced to the next position $pos_6$ in which the mold 38 is reopened in the operating stage X of FIGURE 9k. This is the starting position of $pos_1$ and, as will be obvious, the indexing of the turntable from $pos_6$ to $pos_1$ provides for repeating the cycle described hereinabove.

From the foregoing description of the machine and the method, it will be understood that the method results in a completely formed article, such as a bottle, which does not require any after-machining so that scrap plastic is avoided.

It will also be obvious that the invention provides for an exact control to obtain a substantially uniform wall thickness by forming a parison having uneven wall thickness over a specially shaped mandrel.

It will also be understood that the machine enables a continuous mass production since the injection molding is performed with each of the mandrel structures simultaneously with the performance of the other operating steps at each of the other stations in the manner described.

The extrusion is continuous and as a safety precaution, a slip clutch between the driving motor and the screw which controls the plastic extrusion may be provided.

In order to prevent back-flow of the plastic the moment the injection takes place, a check valve 19 is, as indicated in FIGURES 4 and 5, built in between the accumulator and the manifold.

The valve 23, shown in FIGURE 8 at the top of the mandrel, will prevent the plastic from entering the air duct 50 in the mandrel 22, but will allow the free flow of air during the blowing and ejection of the article.

The stagewise movement of the turntable and the indexing thereof can be effectuated with any commercial type index mechanism which may include a geneva drive and a suitable hydraulic cylinder system. Such turntable indexing arrangements are available as commercial items and are well known to those skilled in the art and will, therefore, not be described in any detail herein.

It will be understood that the invention is not limited to the specific embodiment of the machine as shown and described with reference to the accompanying drawing and that various modifications are possible within the scope of the invention. By way of example, a machine for a continuous mass production may be designed with a one-mold set-up or a two-mold set-up, depending on the output required.

It will also be obvious that the stages I–X of FIGURES 9a–9k can be carried out at a different number of indexing positions of the turntable. By way of example, the turntable may have four positions only with the operating stages III, IV and V carried out at the second position, the operating stages VI, VII and VIII carried out at the second position, and the stages IX and X carried out at the third position. Also other modifications of the timing scheme will be possible depending on the machine.

While I have shown and described herein one embodiment in accordance with the present invention, it is understood that the same is not limited thereto, but is susceptible of many changes and modifications within the spirit and scope of the present invention and I, therefore, do not wish to be limited to the details shown and described herein but intend to cover all such changes and modifications as are encompassed by the scope of the appended claims.

I claim:

1. A machine for manufacturing hollow articles of synthetic resinous material having a neck portion, comprising parison mold means including a substantially vertical parison mold adapted to receive a mandrel surrounded by neck-receiving means adapted to be opened and closed and disposed at one end of said parison mold, means for injecting synthetic resinous material into said parison mold to form a parison on said mandrel, means for withdrawing said mandrel with said neck-receiving means maintained closed over the neck portion of the parison formed on said mandrel in said parison mold by reciprocation of said mandrel substantially in a vertical direction, a blow mold having a molding cavity corresponding to the size of the article and means in said blow mold for receiving said neck-receiving means, means for transferring said mandrel with said parison formed thereon as well as said neck-receiving means to said blow mold, means for blowing said article in said blow mold, means for withdrawing said mandrel from said blow mold in the direction of said reciprocation while leaving said neck-receiving means in said blow mold, and means for opening said blow mold together with said neck-receiving means to remove the article.

2. A machine for manufacturing hollow articles of synthetic resinous material having a neck portion, comprising a substantially vertical turntable, a substantially vertical mandrel supported on said turntable, parison mold means including a substantially vertical parison mold adapted to receive the mandrel, neck-receiving means adapted to be opened and closed and surrounding said mandrel at one end of said parison mold, means for injecting synthetic resinous material into said parison mold to form a parison on said mandrel, means for withdrawing said mandrel with said neck-receiving means maintained closed over the neck portion of the parison formed on said mandrel within said parison mold by reciprocation of said mandrel substantially in a vertical direction, a blow mold supported on said turntable and having a molding cavity corresponding to the size of the article and means in said blow mold for receiving said neck-receiving means, means for transferring said mandrel with said parison formed thereon as well as said neck-receiving means to said blow mold, means for blowing said article in said blow mold, means for withdrawing said mandrel from said blow mold while leaving said neck-receiving means in said blow mold, and means for opening said blow mold together with said neck-receiving means to remove the article, the parison mold being supported outside said turntable in a position capable of receiving the mandrel in a predetermined position of said turntable, said turntable having a plurality of blow mold stations, each provided with at least one blow mold and a corresponding respective mandrel mounted for reciprocation between a position within the blow mold when the latter is closed and a position projecting outside the periphery of the turntable when the blow mold is open, and index means for said turntable to index the same in a plurality of positions in such a manner that the mandrel of each blow mold station comes into alignment with the parison mold, said indexing means including first means for indexing said turntable in a position in which the blow mold is open, the respective mandrel in alignment with the parison mold and the catch means in engagement with the neck-receiving means, second means for reciprocating the mandrel structure to the operative position thereof within the parison mold, third means for extruding the synthetic resinous material into the parison mold and for enabling the extruded synthetic resinous material to cool off sufficiently to permit the parison to slip out of the parison mold, fourth means for reciprocating the mandrel structure with the parison molded thereon into the indexing position thereof in alignment with the respective blow mold, fifth means for closing the respective blow mold and thereupon blowing the article, sixth means for reciprocating the mandrel structure to disengage the catch means from the neck-receiving means, seventh means for re-opening the blow mold and for reading the machine for repeating the cycle of operation; said turntable being provided with a plurality of said blow molds corresponding in number to the mandrel structures thereof, and timing means operatively associated with said first, second, third, fourth, fifth, sixth and seventh means to perform the initial closing of each blow mold and the subsequent cycle steps of the operation of the machine at a plurality of indexing positions of said turntable during the cycle steps including the molding of the parison and the withdrawal thereof from the parison mold at each indexing position.

3. A machine for manufacturing hollow articles of synthetic resinous material having a neck portion, comprising a substantially vertical turntable, a substantially vertical mandrel supported on said turntable, parison mold means including a substantially vertical parison mold adapted to receive the mandrel, neck-receiving means adapted to be opened and closed and surrounding said mandrel at one end of said parison mold, means for injecting synthetic resinous material into said parison mold to form a parison on said mandrel, means for withdrawing said mandrel with said neck-receiving means maintained closed over the neck portion of the parison formed on said mandrel within said parison mold by reciprocation of said mandrel substantially in a vertical direction, a blow mold having a molding cavity corresponding to the size of the article and means in said blow mold for receiving said neck-receiving means, means for transferring said mandrel with said parison formed thereon as well as said neck-receiving means to said blow mold, means for withdrawing said mandrel from said blow mold substantially in the direction of said reciprocation while leaving said neck-receiving means in said blow mold means for blowing said article in said blow mold, and means for opening said blow mold together with said neck-receiving means to remove the article, the parison mold being supported outside said turntable in a position capable of receiving the mandrel in a predetermined position of said turntable.

4. A machine for manufacturing hollow articles of synthetic resinous material having a neck portion, comprising a substantially vertical turntable, a substantially vertical mandrel supported on said turntable, parison mold means including a substantially vertical parison mold adapted to receive the mandrel, neck-receiving means adapted to be opened and closed and surrounding said mandrel at one end of said parison mold, means for injecting synthetic resinous material into said parison mold to form a parison on said mandrel, means for withdrawing said mandrel with said neck-receiving means maintained closed over the neck portion of the parison formed on said mandrel within said parison mold by reciprocation of said mandrel substantially in a vertical direction, a blow mold supported on said turntable and having a molding cavity corresponding to the size of the article and means in said blow mold for receiving said neck-receiving means, means for transferring said mandrel with said parison formed thereon as well as said neck-receiving means to said blow mold, means for blowing said article in said blow mold, means for withdrawing said mandrel from said blow mold substantially in the direction of said reciprocation while leaving the neck-receiving means in said blow mold, and means for opening said blow mold together with said neck-receiving means to remove the article, the parison mold being supported outside said turntable in a position capable of receiving the mandrel in a predetermined position of said turntable.

5. A machine for manufacturing hollow articles of synthetic resinous material having a neck portion, comprising a substantially vertical turntable, a substantially vertical mandrel supported on said turntable, parison mold means including a substantially vertical parison mold adapted to receive the mandrel, neck-receiving means adapted to be opened and closed and surrounding said mandrel at one end of said parison mold, means for injecting synthetic resinous material into said parison mold to form a parison on said mandrel, means for withdrawing said mandrel with said neck-receiving means maintained closed over the neck portion of the parison formed on said mandrel within said parison mold by reciprocation of said mandrel substantially in a vertical direction, a blow mold supported on said turntable and having a molding cavity corresponding to the size of the article and means in said blow mold receiving said neck-receiving means, means for transferring said mandrel with said parison formed thereon as well as said neck-receiving means to said blow mold, means for blowing said article in said blow mold, means for withdrawing said mandrel from said blow mold substantially in the direction of said reciprocation while leaving said neck-receiving means in said blow mold, and means for opening said blow mold together with said neck-receiving means to remove the article, means for withdrawing said mandrel from said blow mold substantially in the vertical direction while leaving said neck-receiving means in said blow mold, the parison mold being supported outside said turntable in a position capable of receiving the mandrel in a predetermined position of said turntable, said turntable having a plurality of blow mold stations, each provided with at least one blow mold and a corresponding respective mandrel mounted for reciprocation between a position within the blow mold when the latter is closed and a position projecting outside the periphery of the turntable when the blow mold is open, and index means for said turntable to index the same in a plurality of positions in such a manner that the mandrel of each blow mold station comes into alignment with the parison mold.

6. A machine for manufacturing hollow articles of synthetic resinous material having a neck portion, comprising parison mold means including a substantially vertical parison mold adapted to receive a mandrel surrounded by neck-receiving means adapted to be opened and closed and disposed at one end of said parison mold, said neck-receiving means being in the form of an annular member having two half-parts, catch means connected with said mandrel operable to engage with said two half-parts to keep the same together, means for injecting synthetic resinous material into said parison mold to form a parison on said mandrel, means for withdrawing said mandrel with said neck-receiving means maintained closed over the neck portion of the parison formed on said mandrel within said parison mold by reciprocation of said mandrel substantially in a vertical direction, a blow mold having a molding cavity corresponding to the size of the article and means for receiving said neck-receiving means, means for transferring said mandrel with said parison formed thereon as well as said neck-receiving means to said blow mold, means for blowing said article in said blow mold, means for withdrawing said mandrel from said blow mold substantially in the vertical direction while leaving said neck-receiving means in said blow mold, and means for opening said blow mold together with said neck-receiving means to remove the article.

7. A machine for manufacturing hollow articles of synthetic resinous material having a neck portion, comprising parison mold means including a substantially vertical parison mold adapted to receive a mandrel surrounded by neck-receiving means adapted to be opened and closed and disposed at one end of said parison mold, said neck-receiving means being in the form of an annular member having two half-parts, catch means rigidly connected with said mandrel and having two complementary engaging parts operable to engage with said two half-parts to keep the same together, said mandrel being mounted for reciprocation in a direction to disengage said catch means from said annular member, means for injecting synthetic resinous material into said parison mold to form a parison on said mandrel, means for reciprocatingly withdrawing said mandrel with said neck-receiving means maintained closed over the neck portion of the parison formed on said mandrel within said parison mold by reciprocation of said mandrel substantially in a vertical direction, a blow mold having a molding cavity corresponding to the size of the article and means for receiving said neck-receiving means, means for transferring said mandrel with said parison formed thereon as well as said neck-receiving means to said blow mold, means for blowing said article in said blow mold, means for withdrawing said mandrel from said blow mold substantially in said vertical direction while leaving said neck-receiving means in said blow mold, and means for opening said blow mold together with said neck-receiving means to remove the article.

8. A machine for manufacturing hollow articles of synthetic resinous material having a neck portion, comprising parison mold means including a substantially vertical parison mold adapted to receive a mandrel surrounded by neck-receiving means adapted to be opened and closed and disposed at one end of said parison mold, said neck-receiving means being in the form of an annular member having two half-parts, catch means rigidly connected with said mandrel and having two complementary engaging parts operable to engage with said two half-parts to keep the same together, said mandrel being mounted for reciprocation in a direction to disengage said catch means from said annular member, means for injecting synthetic resinous material into said parison mold to form a parison on said mandrel, actuating means for reciprocatingly withdrawing said mandrel with said neck-receiving means maintained closed over the neck portion of the parison formed on said mandrel within said parison mold by reciprocation of said mandrel substantially in a vertical direction, a blow mold supported on said turntable and having a molding cavity corresponding to the size of the article and recess means for receiving therein the annular member of said neck-receiving means, means for transferring said mandrel with said parison formed thereon as well as said neck-receiving means to said blow mold, the mandrel structure including said mandrel and said catch means being mounted for reciprocatory movements and being indexable by said actuating means in a plurality of predetermined positions including an interior position in which said catch means is disengaged from said annular member, an intermediate position in which the catch means is in operative engagement with said annular member and said mandrel is received in the blow mold and an exterior position in which said mandrel is adapted to be received in the parison mold, means for blowing said article in said blow mold, means for withdrawing said mandrel from said blow mold while leaving said neck-receiving means in said blow mold, and means for opening said blow mold together with said neck-receiving means to remove the article.

9. A machine for manufacturing hollow articles of synthetic resinous material having a neck portion, comprising a substantially vertical turntable structure, parison mold means including a substantially vertical parison mold adapted to receive a mandrel surrounded by neck-receiving means adapted to be opened and closed and disposed at one end of said parison mold, said neck-receiving means being in the form of an annular member having two half-parts, catch means rigidly connected with said mandrel and having two complementary engaging parts operable to engage with said two half-parts to keep the same together, said mandrel being mounted for reciprocation in a direction to disengage said catch means from said annular member, means for injecting synthetic resinous material into said parison mold to form a parison on said mandrel, actuating means for reciprocatingly withdrawing said mandrel with said neck-receiving means maintained closed over the neck portion of the parison formed on said mandrel within said parison mold by reciprocation of said mandrel substantially in a vertical direction, a blow mold supported on said turntable and having a molding cavity corresponding to the size of the article and recess means for receiving therein the annular member of said neck-receiving means, means for transferring said mandrel with said parison formed thereon as well as said neck-receiving means to said blow mold, the mandrel structure including said mandrel and said catch means being mounted for reciprocatory movements and being indexable by said actuating means in a plurality of predetermined positions including an interior position in which said catch means is disengaged from said annular member, an intermediate position in which the catch means is in operative engagement with said annular member and said mandrel is received in the blow mold and an exterior position in which said mandrel is adapted to be received in the parison mold, means for blowing said article in said blow mold, and means for opening said blow mold together with said neck-receiving means to remove the article, said mandrel being supported on said turntable and the parison mold being supported outside said turntable in a position capable of receiving the mandrel in a predetermined position of the turntable, said turntable having a plurality of blow mold stations, each provided with at least one blow mold and a corresponding respective mandrel mounted for reciprocation between a position within the blow mold when the latter is closed and a position projecting outside the periphery of the turntable when the blow mold is open, and index means for said turntable to index the same in a plurality of positions in such a manner that the mandrel of each blow mold station comes into alignment with the parison mold.

10. A machine for manufacturing hollow articles of synthetic resinous material having a neck portion, comprising a substantially vertical turntable structure, parison mold means including a substantially vertical parison mold adapted to receive a mandrel surrounded by neck-receiving means adapted to be opened and closed and disposed at one end of said parison mold, said neck-receiving means being in the form of an annular member having two half-parts, catch means rigidly connected with said mandrel and having two complementary engaging parts operable to engage with said two half-parts to keep the same together, said mandrel being mounted for reciprocation in a direction to disengage said catch means from said annular member, means for injecting synthetic resinous material into said parison mold to form a parison on said mandrel, actuating means for reciprocatingly withdrawing said mandrel with said neck-receiving means maintained closed over the neck portion of the parison formed on said mandrel within said parison mold by reciprocation of said mandrel substantially in a vertical direction, a blow mold supported on said turntable and having a molding cavity corresponding to the size of the article and recess means for receiving therein the annular member of said neck-receiving means, means for transferring said mandrel with said parison formed thereon as well as said neck-receiving means to said blow mold, the mandrel structure including said mandrel and said catch means being mounted for reciprocatory movements and being indexable by said actuating means in a plurality of predetermined positions including an interior position in which said catch means is disengaged from said annular member, an intermediate position in which the catch means is in operative engagement with said annular member and said mandrel is received in the blow mold and an exterior position in which said mandrel is adapted to be received in the parison mold, means for blowing said article in said blow mold, and means for opening said blow mold together with said neck-receiving means to remove the article, said mandrel being supported on said turntable and the parison mold being supported outside said turntable in a position capable of receiving the mandrel in a predetermined position of the turntable, said turntable having a plurality of blow mold stations, each provided with at least one blow mold and a corresponding respective mandrel mounted for reciprocation between a position within the blow mold when the latter is closed and a position projecting outside the periphery of the turntable when the blow mold is open, and index means for said turntable to index the same in a plurality of positions in such a manner that the mandrel of each blow mold station comes into alignment with the parison mold, said indexing means including first means for indexing said turntable in a position in which the blow mold is open, the respective mandrel in alignment with the parison mold and the catch means in engagement with the neck-receiving means, second means for reciprocating the mandrel structure to the operative position thereof within the parison mold, third means for extruding the synthetic resinous material into the parison mold and for enabling the extruded synthetic resinous material to cool off sufficiently to permit the parison to slip out of the parison mold, fourth means for reciprocating the mandrel structure with the parison molded thereon into the indexing position thereof in alignment with the respective blow mold, fifth means for closing the respective blow mold and thereupon blowing the article, sixth means for reciprocating the mandrel structure to disengage the catch means from the neck-receiving means, seventh means for re-opening the blow mold and for reading the machine for repeating the cycle of operation; said turntable being provided with a plurality of said blow molds corresponding in number to the mandrel structures thereof, and timing means operatively associated with said first, second, third, fourth, fifth, sixth and seventh means to perform the initial closing of each blow mold and the subsequent cycle steps of the operation of the machine at a plurality of indexing positions of said turntable during the cycle steps including the molding of the parison and the withdrawal thereof from the parison mold at each indexing position.

11. A machine for manufacturing hollow articles of synthetic resinous material having a neck portion, comprising parison mold means including a substantially vertical parison mold adapted to receive a mandrel surrounded by neck-receiving means adapted to be opened and closed and disposed at one end of said parison mold, means for injecting synthetic resinous material into said parison mold to form a parison on said mandrel, said mandrel having different cross sections over its length to effectively provide a parison of predetermined varying thickness, means for withdrawing said mandrel with said neck-receiving means maintained closed over the neck portion of the parison formed on said mandrel in said parison mold by reciprocation of said mandrel substantially in a vertical direction, a blow mold having a molding cavity corresponding to the size of the article and means in said blow mold for receiving said neck-receiving means, means for transferring said mandrel with said parison formed thereon as well as said neck-receiving means to said blow mold, means for blowing said article in said blow mold, means for withdrawing said mandrel from said blow mold substantially in said vertical direction while leaving said neck-receiving means in said blow mold, and means for opening said blow mold together with said neck-receiving means to remove the article.

12. A machine for manufacturing hollow articles of synthetic resinous material having a neck portion, comprising a mandrel, parison mold means including a parison mold adapted to receive the mandrel, neck-receiving means adapted to be opened and closed and surrounding said mandrel at one end of said parison mold, means for injecting synthetic resinous material into said parison mold to form a parison on said mandrel, means for withdrawing said mandrel with said neck-receiving means maintained closed over the neck portion of the parison formed on said mandrel within said parison mold by a reciprocation of said mandrel substantially in the axial direction thereof, a blow mold having a molding cavity corresponding to the size of the article and means in said blow mold for receiving said neck-receiving means, means for transferring said mandrel with said parison formed thereon as well as said neck-receiving means to said blow mold, means for blowing said article in said mold, means for withdrawing said mandrel from said blow mold substantially in the axial direction of said mandrel while leaving said neck-receiving means in said blow mold, and means for opening said blow mold together with the neck-receiving means to enable removal of the article.

13. A machine according to claim 12, wherein the axial direction of said mandrel is located substantially in the vertical direction.

References Cited

UNITED STATES PATENTS

| | | | |
|---|---|---|---|
| 2,315,478 | 3/1943 | Parkhurst | 18—55 |
| 3,011,216 | 12/1961 | Gussoni | 18—55 |
| 2,974,362 | 3/1961 | Knowles | 18—5 |
| 3,002,225 | 10/1961 | Goller | 18—5 |
| 1,837,068 | 12/1931 | Richter | 215—1 |
| 2,830,721 | 4/1958 | Pinsky et al. | 215—1 |

WILBUR L. McBAY, *Primary Examiner.*

J. SPENCER OVERHOLSER, MICHAEL V. BRINDISI, *Examiners.*

L. D. RUTLEDGE, H. E. MINCHEW, *Assistant Examiners.*